(12) United States Patent
Baldwin et al.

(10) Patent No.: US 10,589,879 B2
(45) Date of Patent: Mar. 17, 2020

(54) CROSS-FEEDING PROPELLANT BETWEEN STACKED SPACECRAFT

(71) Applicant: Space Systems/Loral, LLC, Palo Alto, CA (US)

(72) Inventors: Jeff Aaron Baldwin, Sunnyvale, CA (US); Jonathan Noland, San Jose, CA (US); Alfred Heikal Tadros, Los Altos, CA (US); Jeffrey Donald Stoen, Palo Alto, CA (US); Adam Maher, Palo Alto, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 432 days.

(21) Appl. No.: 15/616,803

(22) Filed: Jun. 7, 2017

(65) Prior Publication Data

US 2018/0354659 A1    Dec. 13, 2018

(51) Int. Cl.
  *B64G 1/64*      (2006.01)
  *B64G 1/40*      (2006.01)
  (Continued)

(52) U.S. Cl.
  CPC .............. *B64G 1/402* (2013.01); *B64G 1/002* (2013.01); *B64G 1/007* (2013.01); *B64G 1/242* (2013.01);
  (Continued)

(58) Field of Classification Search
  CPC ........ B64G 1/002; B64G 1/007; B64G 1/242; B64G 1/401; B64G 1/405; B64G 1/64;
  (Continued)

(56) References Cited

U.S. PATENT DOCUMENTS

| | | | | | |
|---|---|---|---|---|---|
| 4,834,324 | A | * | 5/1989 | Criswell ................ | B64G 1/002 244/158.9 |
| 5,129,602 | A | * | 7/1992 | Leonard ................. | B64G 1/002 244/172.2 |

(Continued)

FOREIGN PATENT DOCUMENTS

| | | |
|---|---|---|
| FR | 3 004 166 A1 | 10/2014 |
| WO | WO 2008/066512 A2 | 6/2008 |
| WO | WO 2016/168484 | 10/2016 |

OTHER PUBLICATIONS

International Preliminary Report and Written Opinion dated Oct. 26, 2017 in PCT Application No. PCT/US2016/027568.

(Continued)

*Primary Examiner* — Brian M O'Hara
*Assistant Examiner* — Michael B. Kreiner
(74) *Attorney, Agent, or Firm* — Weaver Austin Villeneuve & Sampson LLP

(57) ABSTRACT

A first spacecraft and a second spacecraft are configured to be disposed together, in a launch configuration, for launch by a single launch vehicle. In the launch configuration, the first spacecraft is mechanically coupled with a primary payload adapter of the launch vehicle, and the second spacecraft is mechanically coupled with the first spacecraft by way of an inter-spacecraft coupling arrangement. The spacecraft are configured to be deployed, following injection into a first orbit by the launch vehicle, by separating the first spacecraft from the primary payload adapter while the second spacecraft is mechanically coupled with the first spacecraft. A first onboard propulsion subsystem of the first spacecraft includes one or more thrusters configured to execute an orbit transfer maneuver from the first orbit to a second orbit. A propellant line arrangement detachably couples the first onboard propulsion subsystem with a sec- (Continued)

ond propellant storage arrangement on the second spacecraft.

20 Claims, 7 Drawing Sheets

(51) Int. Cl.
 B64G 1/24 (2006.01)
 B64G 1/26 (2006.01)
 B64G 1/00 (2006.01)
(52) U.S. Cl.
 CPC ............ B64G 1/26 (2013.01); B64G 1/401 (2013.01); B64G 1/405 (2013.01); B64G 1/641 (2013.01); B64G 1/645 (2013.01); B64G 1/64 (2013.01); B64G 2001/643 (2013.01)
(58) Field of Classification Search
 CPC ... B64G 1/641; B64G 2001/643; B64G 1/645
 See application file for complete search history.

(56) References Cited

U.S. PATENT DOCUMENTS

| | | | | |
|---|---|---|---|---|
| 5,141,181 | A * | 8/1992 | Leonard | B64G 1/002 244/172.2 |
| 5,143,328 | A * | 9/1992 | Leonard | B64G 1/002 244/171.3 |
| 5,979,833 | A | 11/1999 | Eller et al. | |
| 6,488,237 | B1 * | 12/2002 | Glasser | B64G 1/14 244/171.1 |
| 7,832,687 | B1 | 11/2010 | Das et al. | |
| 7,866,607 | B2 | 1/2011 | Benedict | |
| 7,905,453 | B2 | 3/2011 | Benedict | |
| 8,511,617 | B2 | 8/2013 | Caplin et al. | |
| 8,915,472 | B2 | 12/2014 | Aston et al. | |
| 9,145,216 | B2 | 9/2015 | Gascon et al. | |
| 9,180,984 | B2 | 11/2015 | Peterka, III et al. | |
| 2002/0190160 | A1 | 12/2002 | Fleeter et al. | |
| 2007/0012821 | A1 * | 1/2007 | Buehler | B64G 1/402 244/171.9 |
| 2008/0149776 | A1 | 6/2008 | Benedict | |
| 2008/0237399 | A1 | 10/2008 | Caplin et al. | |
| 2008/0265098 | A1 | 10/2008 | Connelly et al. | |
| 2010/0311417 | A1 | 12/2010 | Korb et al. | |
| 2014/0017992 | A1 | 1/2014 | Bigras et al. | |
| 2014/0061386 | A1 | 3/2014 | Peterka et al. | |
| 2015/0028159 | A1 | 1/2015 | Vichnin et al. | |
| 2015/0083865 | A1 | 3/2015 | Nakasone et al. | |
| 2015/0151855 | A1 | 6/2015 | Richards et al. | |
| 2016/0075453 | A1 | 3/2016 | Sauzay et al. | |
| 2016/0304219 | A1 | 10/2016 | Tadros et al. | |

OTHER PUBLICATIONS

U.S. Office Action dated Oct. 26, 2017 in U.S. Appl. No. 15/098,122.
International Search Report and Written Opinion dated Jul. 18, 2016 in PCT/US2016/027568.
Benedict, B., "Hosted Piggyback Microsats/Equipment Panels on Intelsat Satellites," STO Rapid Study Request, Intelsat Satellite Services, Dec. 6, 2006, 31 pages.
Glubke, Scott E., "Engineering Test Results for the Moong Single Line Disconnect," NASA Technical Memorandum 100755, NASA, Goddard Space Flight Center, Greenbelt, MD, 1990, 42 pages.
U.S. Final Office Action dated Mar. 12, 2018 in U.S. Appl. No. 15/098,122.
European Office Action dated Oct. 2, 2019 in EP Application No. 18 172 498.0.
U.S. Final Office Action dated Nov. 26, 2018 in U.S. Appl. No. 15/098,122.
U.S. Office Action dated Jul. 16, 2018 in U.S. Appl. No. 15/098,122.
U.S. Office Action dated Mar. 29, 2019 in U.S. Appl. No. 15/098,122.
Larson et al.,"Space Mission Analysis and Design," Third ed., Fifth Printing, Space Technology Library, El Segundo, CA: Microcosm Press, 2003, pp. 301-305.

* cited by examiner

CROSS-FEEDING PROPELLANT BETWEEN STACKED SPACECRAFT

TECHNICAL FIELD

This invention relates generally to a system including two or more spacecraft configured to undergo orbit transfer maneuvers in a stacked configuration, and more particularly a configuration where a thruster on a first of the two or more spacecraft is detachably coupled with a propellant supply of a second of the two or more spacecraft.

BACKGROUND

The assignee of the present invention designs and manufactures spacecraft for communications and broadcast services. The spacecraft are carried into space, into a transfer orbit or an operational orbit, for example, by a launch vehicle.

It is sometimes desirable to configure two or more spacecraft for simultaneous launch on a single launch vehicle. US patent publication number 2016/0304219, assigned to the assignee of the present invention, and hereby incorporated by reference in its entirety into the present application, discloses a stacked launch configuration where at least a portion of orbit raising is performed with the two or more spacecraft coupled together and allocation of orbit raising capability between the two or more spacecraft is optimized.

FIG. 1 illustrates an example of two spacecraft configured to be launched within a common fairing 1001 of a launch vehicle (not illustrated). A lower spacecraft 100(1) includes an adapter 107(1) that is mechanically coupled, in the launch configuration, with a primary payload adapter 1002 that may be part of an upper stage (not illustrated) of the launch vehicle. The lower spacecraft 100(1) includes an inter-spacecraft coupling arrangement 109 that is mechanically coupled, in the launch configuration, with an adapter 107(2) of an upper spacecraft 100(2).

The spacecraft may include on-board propulsion subsystems to perform orbit transfer maneuvers. For example the on-board propulsion subsystems, including chemical and/or electric thrusters, may be configured to execute orbit raising maneuvers to transfer the spacecraft from a launch vehicle transfer orbit (or "parking orbit") to an operational orbit, for example, to a geosynchronous orbit. The on-board propulsion subsystems may also be configured to perform stationkeeping and for attitude control/momentum management purposes. For a stacked launch configuration such as illustrated in FIG. 1, at least a portion of orbit transfer maneuvers may be performed with the two or more spacecraft coupled together.

The spacecraft thrusters may be broadly categorized as either "chemical" or "electric" based on the respective primary energy source. Chemical thrusters, for example bipropellant thrusters, deliver thrust by converting chemical energy stored in the propellant to kinetic energy delivered to combustion products of the chemical propellant, e.g., a fuel such as monomethyl hydrazine and an oxidizer such as dinitrogen tetroxide.

A propulsion system may include chemical thrusters of diverse thrust levels for different mission phases. For example, orbit transfer maneuvers may be performed with a relatively high thrust chemical thruster, with a nominal thrust rating of, for example, 300 Newtons (N) or greater. Such a thruster may be referred to herein, and in the claims as a "high thrust chemical thruster" or as a "main satellite thruster" or MST. In addition, the propulsion system may include other chemical thrusters for stationkeeping and attitude control delivering, advantageously, relatively low thrust, for example a nominal thrust rating of less than 30 N and/or electric thrusters having a nominal thrust rating of less than 1 N for orbit transfer and/or stationkeeping.

SUMMARY

The present inventors have appreciated, where two or more spacecraft are configured to be launched in a stacked launch configuration, propellant stored in an upper spacecraft may advantageously be made available for use, by way of a detachable coupling, by a thruster on a lower spacecraft. The presently disclosed techniques contemplate that the upper spacecraft may avoid carrying an MST, with a consequent mass and cost savings. In some implementations, a reduction in total height of the stacked spacecraft may be realized.

According to some implementations, a system includes at least two spacecraft, including at least a first spacecraft and a second spacecraft, the at least two spacecraft disposed together, in a launch configuration, for launch by a single launch vehicle. In the launch configuration, the first spacecraft is mechanically coupled with a primary payload adapter of the launch vehicle, and the second spacecraft is mechanically coupled with the first spacecraft by way of an inter-spacecraft coupling arrangement. The system is configured to be deployed, following injection into a first orbit by the launch vehicle, by separating the first spacecraft from the primary payload adapter while the second spacecraft is mechanically coupled with the first spacecraft. The first spacecraft includes a first onboard propulsion subsystem including a first propellant storage arrangement. The second spacecraft includes a second onboard propulsion subsystem including a second propellant storage arrangement. The first onboard propulsion subsystem includes one or more thrusters configured to execute an orbit transfer maneuver from the first orbit to a second orbit. The system includes a propellant line arrangement that detachably couples the first propellant storage arrangement with the second propellant storage arrangement.

In some examples, the one or more thrusters may be configured to execute the orbit transfer maneuver includes a main satellite thruster (MST). In some examples, the MST may be a high thrust chemical thruster. In some examples, propellant stored in each of the first propellant storage arrangement and the second propellant storage arrangement may be available for use by the MST.

In some examples, the one or more thrusters configured to execute the orbit transfer maneuver may include a high specific impulse electric thruster. In some examples, propellant stored in each of the first propellant storage arrangement and the second propellant storage arrangement is available for use by the high specific impulse electric thruster.

In some examples, the one or more thrusters configured to execute the orbit transfer maneuver may include one or both of a first high specific impulse electric thruster and a first high thrust chemical thruster. In some examples, propellant stored in each of the first propellant storage arrangement and the second propellant storage arrangement may be available for use by at least one of the first high specific impulse electric thruster and a first high thrust chemical thruster. In some examples, the second onboard propulsion subsystem may not include a high thrust chemical thruster. In some examples, the second onboard propulsion subsystem may include one or both of a monopropellant thruster and a cold gas thruster, does not include high thrust chemical thruster and does not include a high specific impulse electric thruster.

In some examples, the propellant line arrangement may include a line disconnect including a proximal portion and a distal portion, each of the proximal portion and the distal portion including a respective valving element. In some examples, the respective valving elements permit propellant flow when the distal portion and the proximal portion are mutually engaged and prevent propellant flow when the distal portion and the proximal portion are detached.

According to some implementations, a method includes (i) deploying a payload stack including at least a first spacecraft and a second spacecraft, the first spacecraft and the second spacecraft disposed together, in a launch configuration, for launch by a single launch vehicle, wherein deploying the payload stack includes separating the first spacecraft from the single launch vehicle while the second spacecraft is mechanically coupled with the first spacecraft; (ii) executing an orbit transfer maneuver from a first orbit to a second orbit; and (iii) detaching the second spacecraft from the first spacecraft only after executing the orbit transfer maneuver. The first spacecraft includes a first onboard propulsion subsystem including a first propellant storage arrangement. The second spacecraft includes a second onboard propulsion subsystem including a second propellant storage arrangement. The first onboard propulsion subsystem includes one or more thrusters configured to execute an orbit transfer maneuver from the first orbit to a second orbit. The payload stack includes a propellant line arrangement that detachably couples the first propellant storage arrangement with the second propellant storage arrangement.

In some examples, the propellant stored in each of the first propellant storage arrangement and the second propellant storage arrangement may be available for use by the first onboard propulsion subsystem.

In some examples, the one or more thrusters configured to execute the orbit transfer maneuver may include one or both of a first high specific impulse electric thruster and a first high thrust chemical thruster. In some examples, propellant stored in each of the first propellant storage arrangement and the second propellant storage arrangement may be available for use by at least one of the first high specific impulse electric thruster and a first high thrust chemical thruster. In some examples, the second onboard propulsion subsystem may not include a high thrust chemical thruster.

In some examples, the propellant line arrangement may include a line disconnect including a proximal portion and a distal portion, each of the proximal portion and the distal portion including a respective valving element. In some examples, the respective valving elements may permit propellant flow when the distal portion and the proximal portion are mutually engaged and prevent propellant flow when the distal portion and the proximal portion are detached. In some examples, detaching the second spacecraft from the first spacecraft may include detaching the proximal portion of the propellant line arrangement from the distal portion of the propellant line arrangement.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The present inventors have appreciated that overall performance of a launch vehicle payload system that includes a first spacecraft and a second spacecraft to be launched as a stack (the "payload stack") may be improved by configuring the first spacecraft to perform at least some substantial part of orbit transfer maneuvers, for the benefit of both spacecraft following deployment from the launch vehicle and prior to separation of the first spacecraft from the second spacecraft. In other words, the first spacecraft may include a first onboard propulsion subsystem configured to execute an orbit transfer maneuver for the payload stack from the first orbit to a second orbit. As a result of the presently disclosed techniques, at least some propellant stored in the second spacecraft may be made available for use by the first onboard propulsion subsystem.

Figure 2:
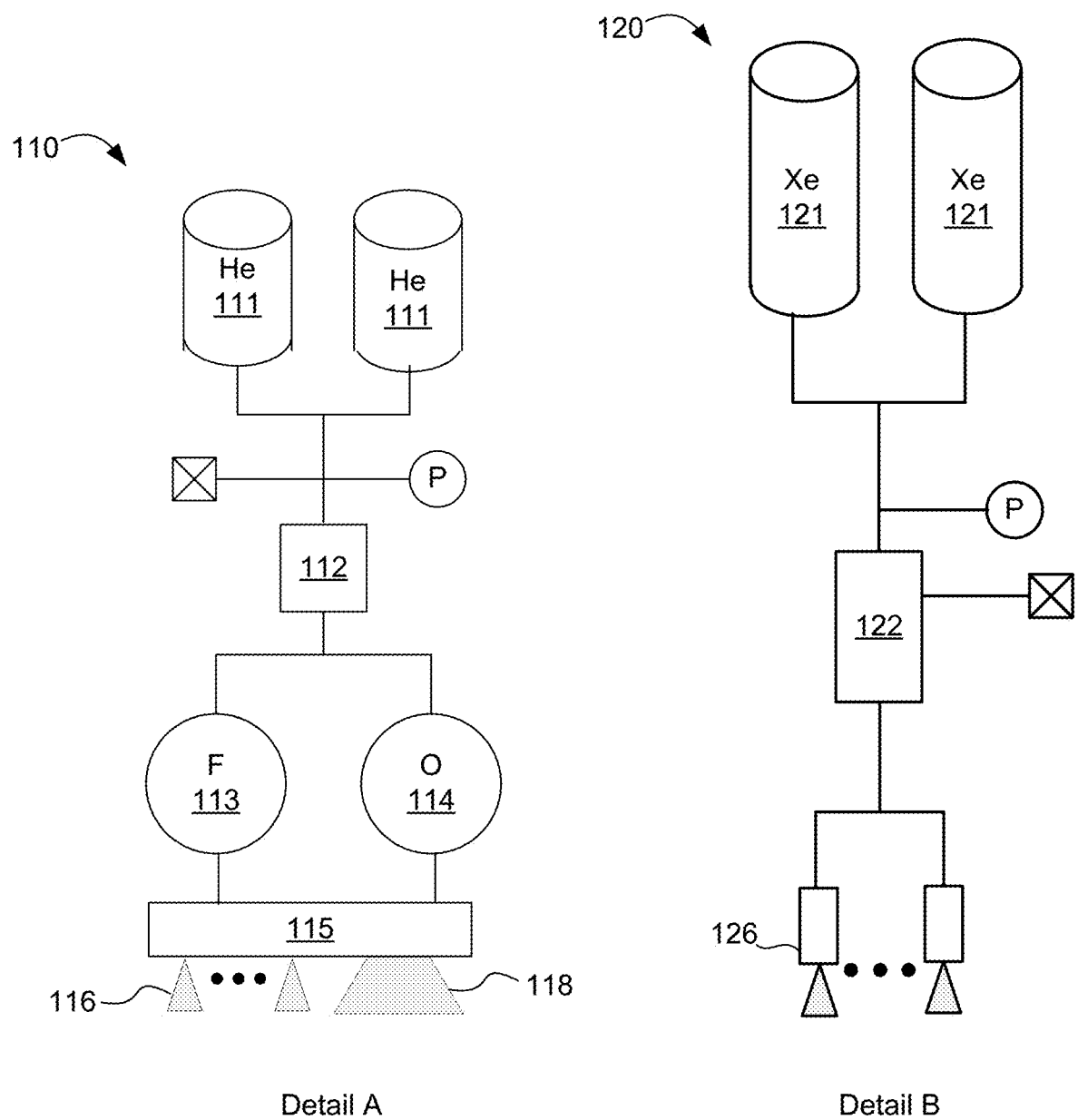
FIG. 2 illustrates two examples of onboard propulsion subsystems that are within the contemplation of the present disclosure.

FIG. 2 illustrates two examples of onboard propulsion subsystems that are within the contemplation of the present disclosure. Referring first to Detail A, an example of an onboard propulsion subsystem configured to include bipropellant thrusters is illustrated. The on-board propulsion subsystem 110 may include any number of low thrust chemical thrusters 116 and/or a MST 118 manifolded by way of a control module 115 with fuel tank 113 and oxidizer tank 114. The fuel tank 113 and the oxidizer tank 114 may each be loaded with a desired quantity of liquid propellant, and include an ullage volume, gaseous pressure of which may be regulated by a pressure control module 112. For example the pressure control module 112 may include one or more pressure regulators. Helium (He) stored in pressurant tanks 111 at a high pressure may be reduced in pressure by the pressure control module 112 and delivered to the fuel tank 113 and the oxidizer tank 114.

Referring now to Detail B, an on-board propulsion subsystem 120 may include any number of electric thrusters 126 manifolded by way of a propellant management assembly (PMA) 122 with propellant tanks 121. Propellant such as xenon (Xe) stored in tanks 121 at a high pressure may be reduced in pressure by the PMA 122 and delivered to the electric thrusters 126. An electric thruster, as contemplated by the present disclosure, may be configured to deliver a specific impulse of at least 500 seconds and be referred to herein and in the claims as a "high specific impulse electric thruster". The high specific impulse electric thruster may be, for example a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle.

For clarity of illustration, the on-board propulsion subsystem 110 and the on-board propulsion subsystem 120 are depicted as separate arrangements. In some implementations, however, a unified chemical electric propulsion system may be contemplated, as described in U.S. Pat. No. 9,145,216, assigned to the assignee of the present invention and hereby incorporated by reference in its entirety into the present application.

Figure 3:
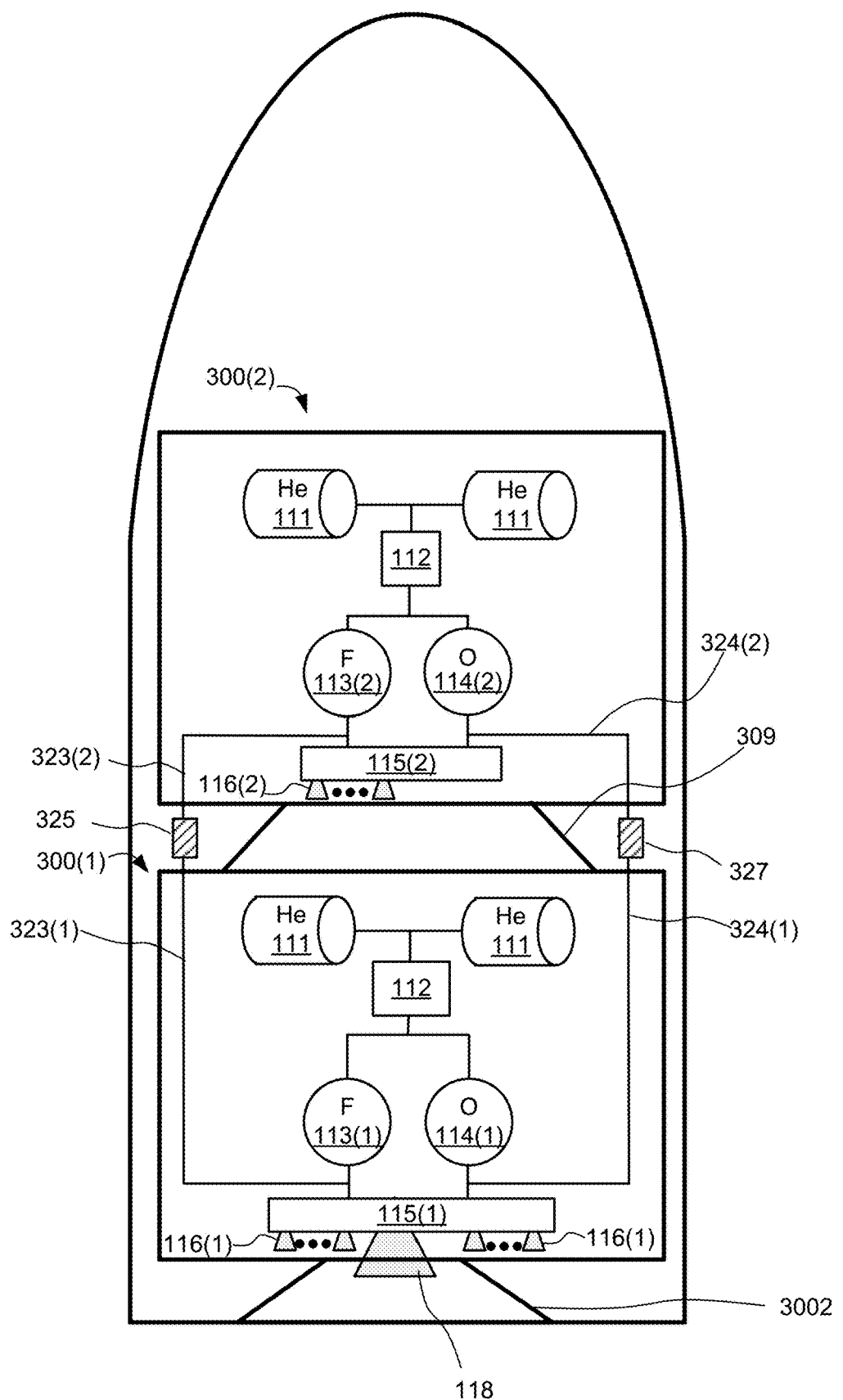
FIG. 3 illustrates a system of two spacecraft disposed in a launch configuration according to an implementation.

FIG. 3 illustrates a system of two spacecraft disposed in a launch configuration according to an implementation. In the illustrated implementation, a first (lower) spacecraft 300(1) is disposed beneath a second (upper) spacecraft 300(2). A launch vehicle includes a primary payload adapter 3002, with which, in the launch configuration, the first spacecraft 300(1) is mechanically coupled. The first spacecraft 300(1) is mechanically coupled with the second spacecraft 300(2), in the launch configuration, by way of an inter-spacecraft coupling arrangement 309. The system of two spacecraft may be injected by the launch vehicle into a first orbit that may be, for example, a low earth orbit or a geosynchronous transfer orbit. Subsequent to being injected into the first orbit, the system may be separated from the launch vehicle. More particularly, the system may be deployed by separating the first spacecraft 300(1) from the primary payload adapter 3002 while the second spacecraft 300(2) remains mechanically coupled with the second spacecraft 300(1) by way of inter-spacecraft coupling arrangement 309.

In the illustrated implementation, the lower spacecraft 300(1) includes an on-board propulsion system such as described in connection with Detail A of FIG. 2. More particularly, in the illustrated implementation, the lower spacecraft 300(1) includes a plurality of low thrust thrusters 116(1) and at least one MST 118 and a first propellant storage arrangement including a fuel tank 113(1), and an oxidizer tank 114(1). The upper spacecraft 300(2) may include one or more low thrust thrusters 116(2), as well as a second propellant storage arrangement including a fuel tank 113(2), and an oxidizer tank 114(2). Advantageously, the upper spacecraft 300(2) may not include an MST.

Propellant from the upper spacecraft 300(2) is made available to the propulsion subsystem of the lower spacecraft by way of propellant lines and propellant line coupling devices. More particularly, propellant line 323(2), coupling device 325, and propellant line 323(1) may couple a port of fuel tank 113(2) of the upper spacecraft 300(2) with a port of fuel tank 113(1) of the first spacecraft 300(1). Similarly, propellant line 324(2), coupling device 327, and propellant line 324(1) may couple a port of oxidizer tank 114(2) of the upper spacecraft 300(2) with a port of oxidizer tank 114(1) of lower spacecraft 300(1). As a result, propellant from the upper spacecraft 300(2) may be made available to the lower spacecraft 300(1) and, more particularly to the MST 118 and low thrust chemical thrusters 116(1). Thus, in some implementations, orbit raising maneuvers may be executed using a single MST 118, drawing propellant from each of two or more stacked spacecraft.

The coupling device 325 and the coupling device 327 may be configured to detachably couple the propellant storage arrangement of the first spacecraft 300(1) with the propellant storage arrangement of the second spacecraft 300(2). In some implementations, one or both of the coupling device 325 and the coupling device 327 may be or include a line disconnect. An example of a line disconnect appropriate for use cases contemplated by the present disclosure is described in NASA Technical Memorandum 100755 (Glubke, "Engineering Test Results for the Moog Single Line Disconnect", Goddard Space Flight Center, 1990) the disclosure of which is hereby incorporated by reference in its entirety into the present application. In some implementations, one or both of the coupling device 325 and the coupling device 327 may include a line disconnect including a proximal portion and a distal portion, each of the proximal portion and the distal portion including a respective valving element. The valving elements may be configured to permit propellant flow when the distal portion and the proximal portion are mutually engaged and prevent propellant flow when the distal portion and the proximal portion are detached.

Figure 4:
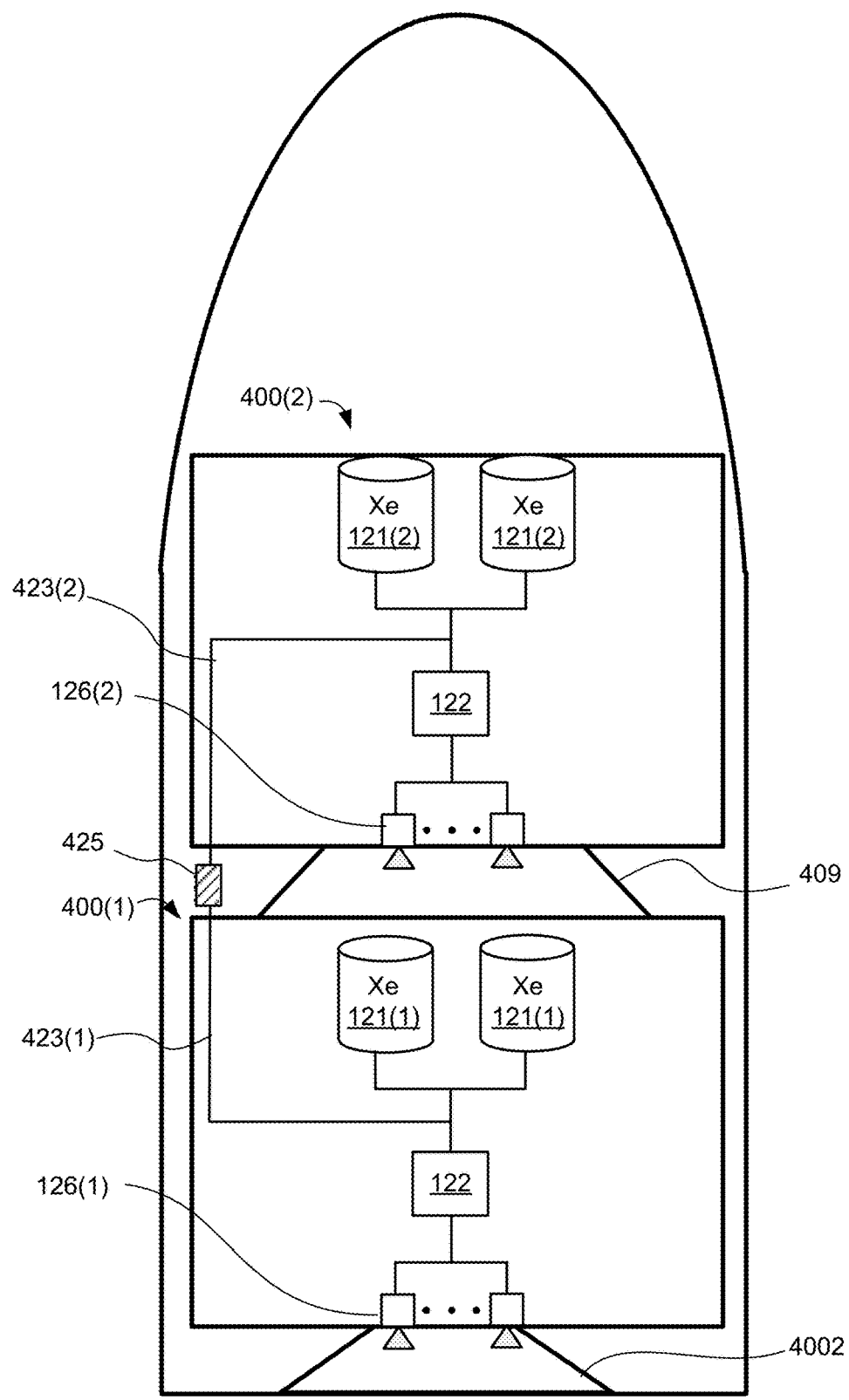
FIG. 4 illustrates a system of two spacecraft disposed in a launch configuration according to another implementation.

FIG. 4 illustrates a system of two spacecraft disposed in a launch configuration according to another implementation. In the illustrated implementation, a lower spacecraft 400(1) is disposed beneath an upper spacecraft 400(2). A launch vehicle includes a primary payload adapter 4002, with which, in the launch configuration, the first spacecraft 400(1) is mechanically coupled. The first spacecraft 400(1) is mechanically coupled with the second spacecraft 400(2), in the launch configuration, by way of an inter-spacecraft coupling arrangement 409. The system of two spacecraft may be injected by the launch vehicle into a first orbit that may be, for example, a low earth orbit or a geosynchronous transfer orbit. Subsequent to being injected into the first orbit, the system may be separated from the launch vehicle. More particularly, the system may be deployed by separating the first spacecraft 400(1) from the primary payload adapter 4002 while the second spacecraft 400(2) remains mechanically coupled with the second spacecraft 400(1) by way of inter-spacecraft coupling arrangement 409.

In the illustrated implementation, the lower spacecraft 400(1) includes an on-board propulsion system such as described in connection with Detail B of FIG. 2. More particularly, in the illustrated implementation, the lower spacecraft 400(1) includes a number of electric thrusters 126 manifolded by way of the PMA 122 with propellant tanks 121. Propellant such as xenon (Xe) stored in tanks 121 at a high pressure may be reduced in pressure by the PMA 122 and delivered to the electric thrusters 126. Advantageously, a quantity and/or power rating of thrusters 126(1) on the lower spacecraft 400(1) may be optimized for executing an orbit transfer maneuver, whereas the thrusters 126(2) on the upper spacecraft 400(2) may be configured so as to primarily or exclusively execute stationkeeping maneuvers. Advantageously, propellant stored in xenon tanks 121(2) of the upper spacecraft 400(2), as well as propellant stored in xenon tanks 121(1) of the lower spacecraft 400(1) may be available for use by the electric thrusters 126(1) on the lower spacecraft 400(1).

Propellant from the upper spacecraft 400(2) is made available to the propulsion subsystem of the lower spacecraft by way of propellant lines and propellant line coupling devices. More particularly, propellant line 423(2), coupling device 425, and propellant line 423(1) may couple a port of propellant tank 121(2) of the upper spacecraft 400(2) with a port of propellant tank 121(1) of lower spacecraft 400(1). As a result, propellant from the upper spacecraft 400(2) may be made available to the lower spacecraft 400(1) and, more particularly to electric thrusters 126(1). Thus in some implementations, orbit raising maneuvers may be executed using one or more thrusters 126(1), drawing propellant from each of two or more stacked spacecraft.

The coupling device 425 may be configured to detachably couple the propellant storage arrangement of the first spacecraft 300(1) with the propellant storage arrangement of the second spacecraft 300(2). In some implementations, the coupling device 425 may be or include a line disconnect as described hereinabove.

Figure 5:
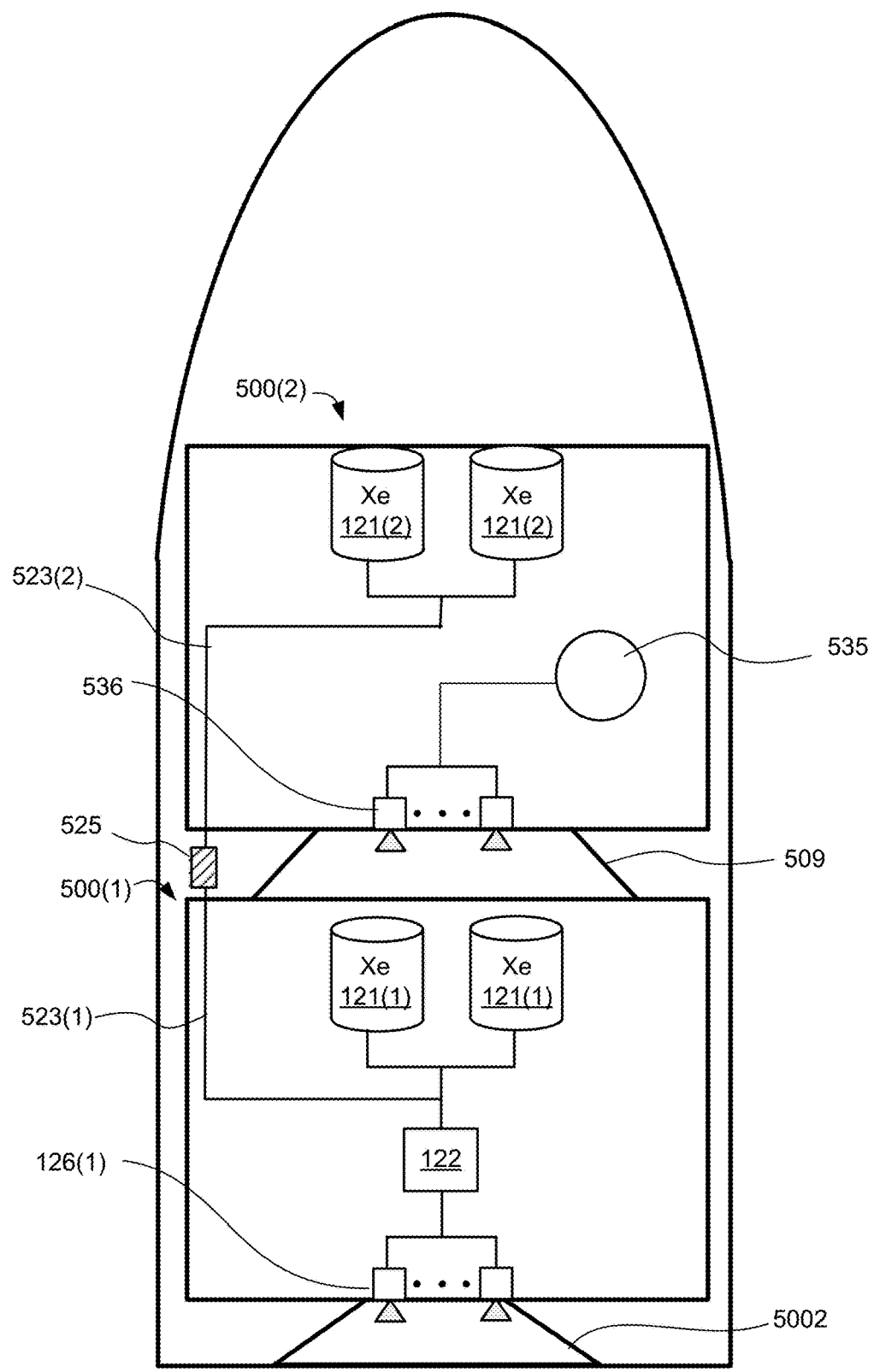
FIG. 5 illustrates a system of two spacecraft disposed in a launch configuration according to a yet further implementation.

FIG. 5 illustrates a system of two spacecraft disposed in a launch configuration according to a yet further implementation. In the illustrated implementation, a first (lower) spacecraft 500(1) is disposed beneath a second (upper) spacecraft 500(2). A launch vehicle includes a primary payload adapter 5002, with which, in the launch configuration, the first spacecraft 500(1) is mechanically coupled. The first spacecraft 500(1) is mechanically coupled with the second spacecraft 500(2), in the launch configuration, by way of an inter-spacecraft coupling arrangement 509. The system of two spacecraft may be injected by the launch vehicle into a first orbit that may be, for example, a low earth orbit or a geosynchronous transfer orbit. Subsequent to being injected into the first orbit, the system may be separated from the launch vehicle. More particularly, the system may be deployed by separating the first spacecraft 500(1) from the primary payload adapter 5002 while the second spacecraft 500(2) remains mechanically coupled with the second spacecraft 500(1) by way of inter-spacecraft coupling arrangement 509.

Figure 1:
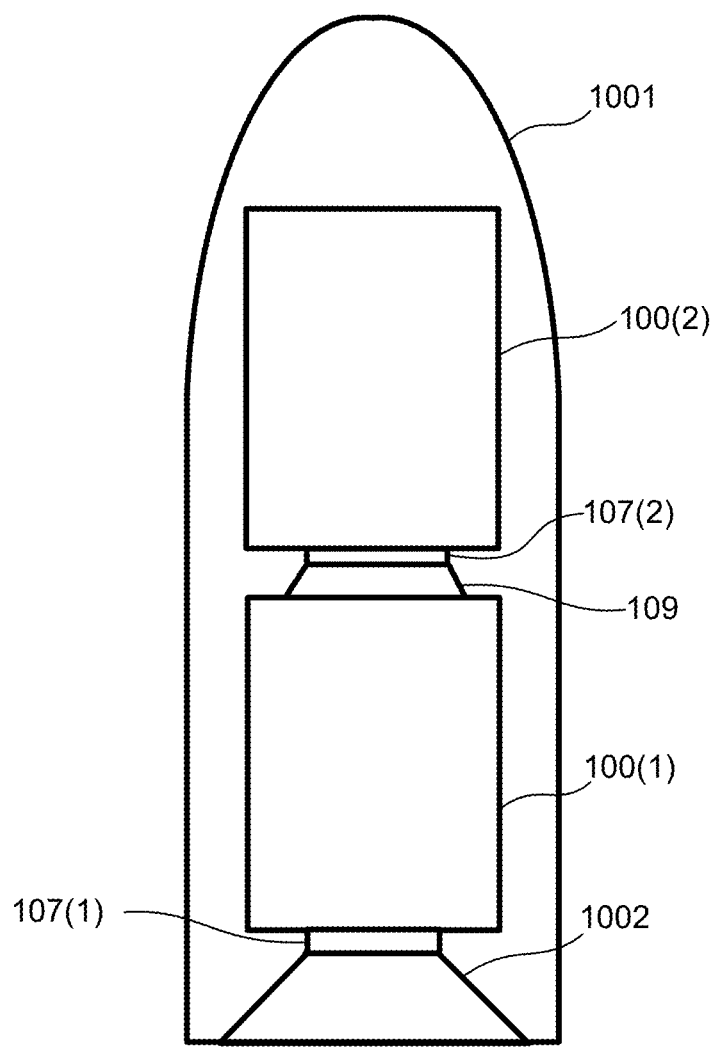
FIG. 1 illustrates an example of two spacecraft configured to be launched within a common fairing 1001 of a launch vehicle.

In the illustrated implementation, the lower spacecraft 500(1) includes an on-board propulsion system such as described in connection with Detail B of FIG. 1. More particularly, in the illustrated implementation, the lower spacecraft 500(1) includes a number of electric thrusters 126 manifolded by way of the PMA 122 with propellant tanks 121. Propellant such as xenon (Xe) stored in tanks 121 at a high pressure may be reduced in pressure by the PMA 122 and delivered to the electric thrusters 126. Advantageously, a quantity and/or power rating of thrusters 126(1) on the lower spacecraft 400(1) may be optimized for executing an orbit transfer maneuver.

In the illustrated implementation, the second spacecraft 500(2) includes thrusters 536, which may be monopropellant or cold gas thrusters, fed by propellant (or cold gas) stored in tank 535. The second spacecraft 500(2), in the illustrated implementation, does not include a high thrust chemical thruster and does not include high specific impulse electric thrusters. The illustrated configuration may be advantageous for missions in which the second spacecraft 500(2), once delivered to or near an operational orbit, does not require a large amount of propulsive energy for orbit transfer or stationkeeping. As a result lower performance, low cost propulsion equipment such as monopropellant or cold gas thrusters may be preferred to high specific impulse electric thrusters or bipropellant thrusters. Advantageously, propellant stored in xenon tanks 121(2) of the upper spacecraft 500(2), as well as propellant stored in xenon tanks 121(1) of the lower spacecraft 500(1) may be available for use by the electric thruster 126(1) on the lower spacecraft 500(1).

Propellant from the upper spacecraft 500(2) is made available to the propulsion subsystem of the lower spacecraft by way of propellant lines and propellant line coupling devices. More particularly, propellant line 523(2), coupling device 525, and propellant line 523(1) may couple a port of propellant tank 121(2) of the second spacecraft 500(2) with a port of propellant tank 121(1) of the first spacecraft 500(1). As a result, propellant from the upper spacecraft 500(2) may be made available to the lower spacecraft 500(1) and, more particularly to electric thrusters 126(1). Thus, in some implementations, orbit raising maneuvers may be executed using one or more thrusters 126(1), drawing propellant from each of two or more stacked spacecraft.

The coupling device 525 may be configured to detachably couple the propellant storage arrangement of the first spacecraft 500(1) with the propellant storage arrangement of the second spacecraft 500(2). In some implementations, the coupling device 525 may be or include a line disconnect as described hereinabove.

Figure 6:
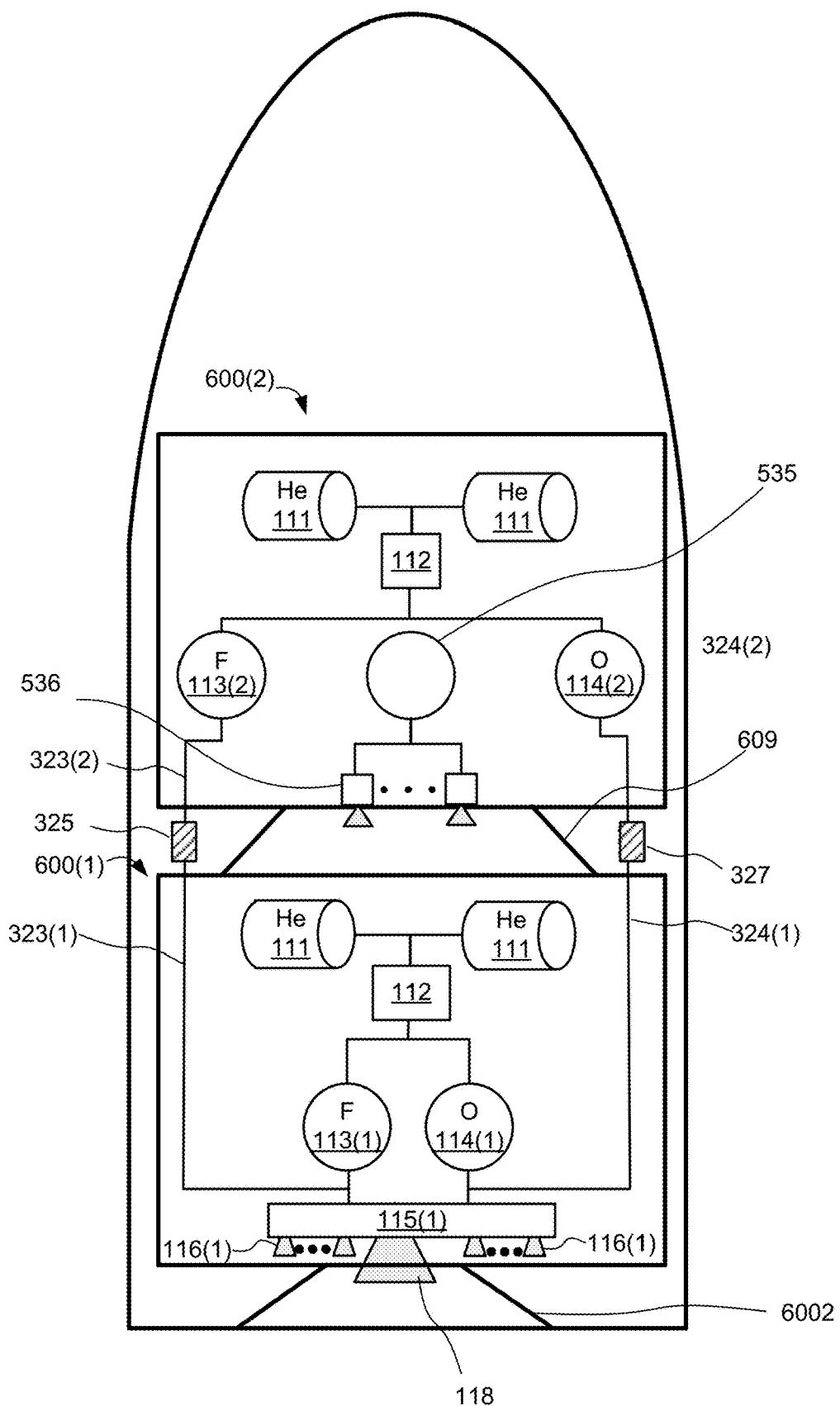
FIG. 6 illustrates a system of two spacecraft disposed in a launch configuration according to another implementation.

FIG. 6 illustrates a system of two spacecraft disposed in a launch configuration according to an implementation. In the illustrated implementation, a first (lower) spacecraft 600(1) is disposed beneath a second (upper) spacecraft 600(2). A launch vehicle includes a primary payload adapter 6002, with which, in the launch configuration, the first spacecraft 600(1) is mechanically coupled. The first spacecraft 600(1) is mechanically coupled with the second spacecraft 600(2), in the launch configuration, by way of an inter-spacecraft coupling arrangement 609. The system of two spacecraft may be injected by the launch vehicle into a first orbit that may be, for example, a low earth orbit or a geosynchronous transfer orbit. Subsequent to being injected into the first orbit, the system may be separated from the launch vehicle. More particularly, the system may be deployed by separating the first spacecraft 600(1) from the primary payload adapter 6002 while the second spacecraft 600(2) remains mechanically coupled with the second spacecraft 600(1) by way of inter-spacecraft coupling arrangement 609.

In the illustrated implementation, the lower spacecraft 600(1) includes an on-board propulsion system such as described in connection with Detail A of FIG. 1. More particularly, in the illustrated implementation, the lower spacecraft 600(1) includes a plurality of low thrust thrusters 116(1) and at least one MST 118 and a first propellant storage arrangement including a fuel tank 113(1), and an oxidizer tank 114(1). The upper spacecraft 600(2) may include a second propellant storage arrangement including a fuel tank 113(2), and an oxidizer tank 114(2). In the illustrated implementation, the second spacecraft 600(2) includes thrusters 536, which may be monopropellant or cold gas thrusters, fed by propellant (or cold gas) stored in tank 535. The second spacecraft 600(2), in the illustrated implementation, does not include a high thrust chemical thruster and does not include high specific impulse electric thrusters.

Advantageously, propellant stored in the fuel tank 113(2), and the oxidizer tank 114(2) of the upper spacecraft 600(2), as well as propellant stored in the fuel tank 113(1), and the oxidizer tank 114(1) of the lower spacecraft 600(1) may be available for use by the MST 118 and low thrust chemical thrusters 116(1) on the lower spacecraft 600(1).

Propellant from the upper spacecraft 600(2) is made available to the propulsion subsystem of the lower spacecraft by way of propellant lines and propellant line coupling devices. More particularly, propellant line 623(2), coupling device 625, and propellant line 623(1) may couple a port of fuel tank 113(2) of the second spacecraft 600(2) with a port of fuel tank 113(1) of the first spacecraft 300(1). As a result, propellant from the upper spacecraft 600(2) may be made available to the lower spacecraft 600(1) and, more particularly to MST 118 and low thrust chemical thrusters 116(1). Thus, in some implementations, orbit raising maneuvers may be executed using a single MST 118, drawing propellant from each of two or more stacked spacecraft.

The coupling device 625 and the coupling device 627 may be configured to detachably couple the propellant storage arrangement of the first spacecraft 600(1) with the propellant storage arrangement of the second spacecraft 600(2). In some implementations, the coupling device 625 and the coupling device 627 may be or include a line disconnect as described hereinabove.

Figure 7:
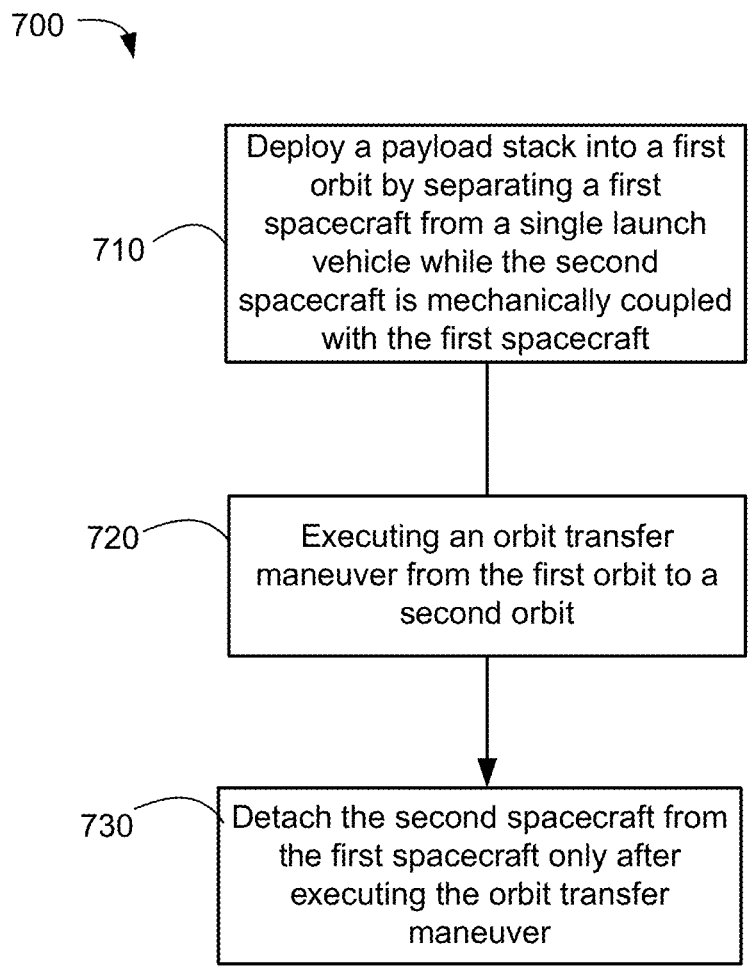
FIG. 7 illustrates a method for deploying a payload stack, according to an implementation.

Referring now to FIG. 7, a method 700 for deploying a system or payload stack will be described. The payload stack includes at least a first spacecraft and a second spacecraft, disposed together, in a launch configuration, for launch by a single launch vehicle. The method may begin, at block 710, by deploying the payload stack, following injection into a first orbit by separating the first spacecraft from the single launch vehicle while the second spacecraft is mechanically coupled with the first spacecraft. As descried hereinabove, the payload stack may include a propellant line arrangement that detachably couples a propellant storage arrangement of the first spacecraft with a propellant storage arrangement of the second spacecraft.

The method 700 may continue at block 720 by executing an orbit transfer maneuver from the first orbit to a second orbit. At least a substantial portion of the orbit transfer maneuver may be executed by using at least one thruster of the first spacecraft. Advantageously, propellant stored in each of the first spacecraft and the second propellant storage arrangement is available for use by the at least one thruster of the second spacecraft. At block 730, the second spacecraft may be detached from the first spacecraft only after executing the orbit transfer maneuver.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A system comprising:
    at least two spacecraft, including at least a first spacecraft and a second spacecraft, the at least two spacecraft disposed together, in a launch configuration, for launch by a single launch vehicle; wherein:
        in the launch configuration, the first spacecraft is mechanically coupled with a primary payload adapter of the launch vehicle, and the second spacecraft is mechanically coupled with the first spacecraft by way of an inter-spacecraft coupling arrangement;
        the system is configured to be deployed, following injection into a first orbit by the launch vehicle, by separating the first spacecraft from the primary payload adapter while the second spacecraft is mechanically coupled with the first spacecraft;
        the first spacecraft includes a first onboard propulsion subsystem including a first propellant storage arrangement;
        the second spacecraft includes a second onboard propulsion subsystem including a second propellant storage arrangement;
        the first onboard propulsion subsystem includes one or more thrusters configured to execute an orbit transfer maneuver from the first orbit to a second orbit; and
        the system includes a propellant line arrangement that detachably couples the first propellant storage arrangement with the second propellant storage arrangement.

2. The system of claim 1, wherein the one or more thrusters configured to execute the orbit transfer maneuver includes a main satellite thruster (MST).

3. The system of claim 2, wherein the MST is a high thrust chemical thruster.

4. The system of claim 3, wherein propellant stored in each of the first propellant storage arrangement and the second propellant storage arrangement is available for use by the MST.

5. The system of claim 1, wherein the one or more thrusters configured to execute the orbit transfer maneuver includes a high specific impulse electric thruster.

6. The system of claim 5, wherein propellant stored in each of the first propellant storage arrangement and the second propellant storage arrangement is available for use by the high specific impulse electric thruster.

7. The system of claim 1, wherein the one or more thrusters configured to execute the orbit transfer maneuver include one or both of a first high specific impulse electric thruster and a first high thrust chemical thruster.

8. The system of claim 7, wherein propellant stored in each of the first propellant storage arrangement and the second propellant storage arrangement is available for use by at least one of the first high specific impulse electric thruster and a first high thrust chemical thruster.

9. The system of claim 7, wherein the second onboard propulsion subsystem does not include a high thrust chemical thruster.

10. The system of claim 7, wherein the second onboard propulsion subsystem includes one or both of a monopropellant thruster and a cold gas thruster, does not include high thrust chemical thruster and does not include a high specific impulse electric thruster.

11. The system of claim 1, wherein the propellant line arrangement includes a line disconnect including a proximal portion and a distal portion, each of the proximal portion and the distal portion including a respective valving element.

12. The system of claim 11, wherein the respective valving elements permit propellant flow when the distal portion and the proximal portion are mutually engaged and prevent propellant flow when the distal portion and the proximal portion are detached.

13. A method comprising:
    deploying a payload stack including at least a first spacecraft and a second spacecraft, the first spacecraft and the second spacecraft disposed together, in a launch configuration, for launch by a single launch vehicle, wherein deploying the payload stack includes separating the first spacecraft from the single launch vehicle while the second spacecraft is mechanically coupled with the first spacecraft;

executing an orbit transfer maneuver from a first orbit to a second orbit; and detaching the second spacecraft from the first spacecraft only after executing the orbit transfer maneuver; wherein:

the first spacecraft includes a first onboard propulsion subsystem including a first propellant storage arrangement;

the second spacecraft includes a second onboard propulsion subsystem including a second propellant storage arrangement;

the first onboard propulsion subsystem includes one or more thrusters configured to execute an orbit transfer maneuver from the first orbit to a second orbit; and the payload stack includes a propellant line arrangement that detachably couples the first propellant storage arrangement with the second propellant storage arrangement.

14. The method of claim 13, wherein propellant stored in each of the first propellant storage arrangement and the second propellant storage arrangement is available for use by the first onboard propulsion subsystem.

15. The method of claim 13, wherein the one or more thrusters configured to execute the orbit transfer maneuver include one or both of a first high specific impulse electric thruster and a first high thrust chemical thruster.

16. The method of claim 15, wherein propellant stored in each of the first propellant storage arrangement and the second propellant storage arrangement is available for use by at least one of the first high specific impulse electric thruster and a first high thrust chemical thruster.

17. The method of claim 15, wherein the second onboard propulsion subsystem does not include a high thrust chemical thruster.

18. The method of claim 13, wherein the propellant line arrangement includes a line disconnect including a proximal portion and a distal portion, each of the proximal portion and the distal portion including a respective valving element.

19. The method of claim 18, wherein the respective valving elements permit propellant flow when the distal portion and the proximal portion are mutually engaged and prevent propellant flow when the distal portion and the proximal portion are detached.

20. The method of claim 19, wherein detaching the second spacecraft from the first spacecraft includes detaching the proximal portion of the propellant line arrangement from the distal portion of the propellant line arrangement.

\* \* \* \* \*